Feb. 25, 1969     D. STOTT     3,429,625

HYDROSTATIC BEARINGS

Filed Aug. 11, 1966

United States Patent Office 3,429,625
Patented Feb. 25, 1969

3,429,625
HYDROSTATIC BEARINGS
Donald Stott, Luton, England, assignor to Joseph Lucas (Industries) Limited, Birmingham, England, a British company
Filed Aug. 11, 1966, Ser. No. 571,769
U.S. Cl. 308—122          3 Claims
Int. Cl. F16c 33/66; F04c 1/04

ABSTRACT OF THE DISCLOSURE

A journal bearing having in its interior one or more openings disposed symmetrically about a plane containing the journal axis and extending in the direction of action of a load which is applied when the bearing is in use, the opening being at the side of the axis remote from that at which the load is applied and at least one further opening at or near a further plane extending perpendicularly to the first mentioned plane, lubricant entering the first opening or openings and escaping through the further opening or openings.

---

This invention relates to bearings which in use are arranged to be loaded in a predetermined direction, the object of the invention being to provide such a bearing in a convenient form.

In accordance with the present invention there is provided a bearing having in its interior one or more openings disposed symmetrically about a plane containing the axis of rotation of the bearing and extending in the direction of action of a load when the bearing is in use, said opening or openings being at the side of the axis of rotation of the bearing remote from the direction from which the load is applied, there being provided means for permitting the entry of lubricant under pressure to said opening or openings and there being at least one further opening in the bearing at or near a further plane containing the axis and extending perpendicularly to the first mentioned plane, through which lubricant entering at the first mentioned opening or openings can escape.

Figure 1:
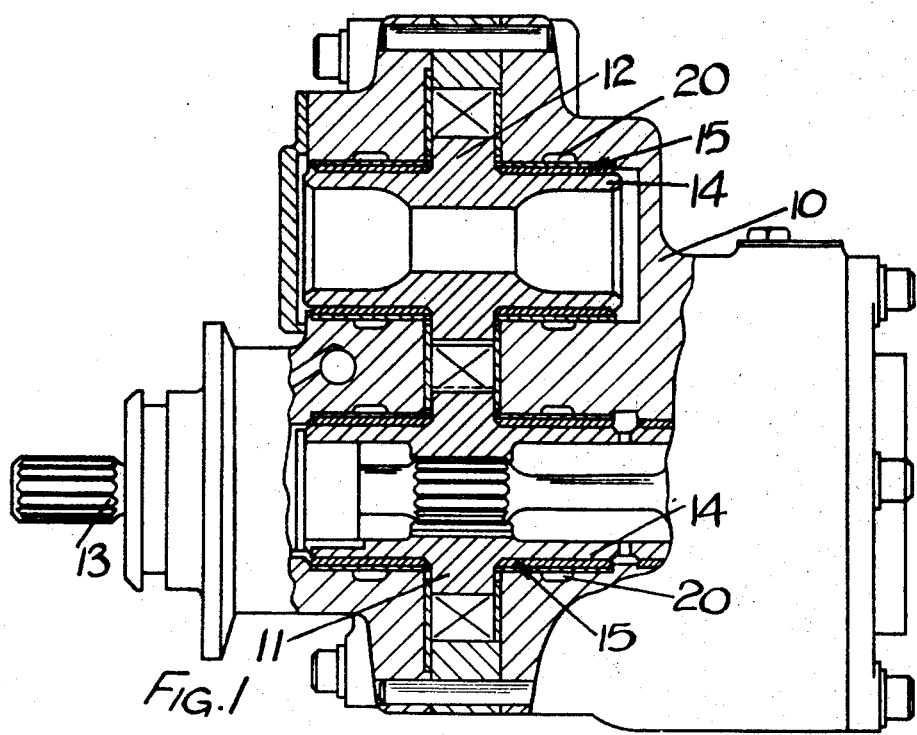
Figures 2, 3:
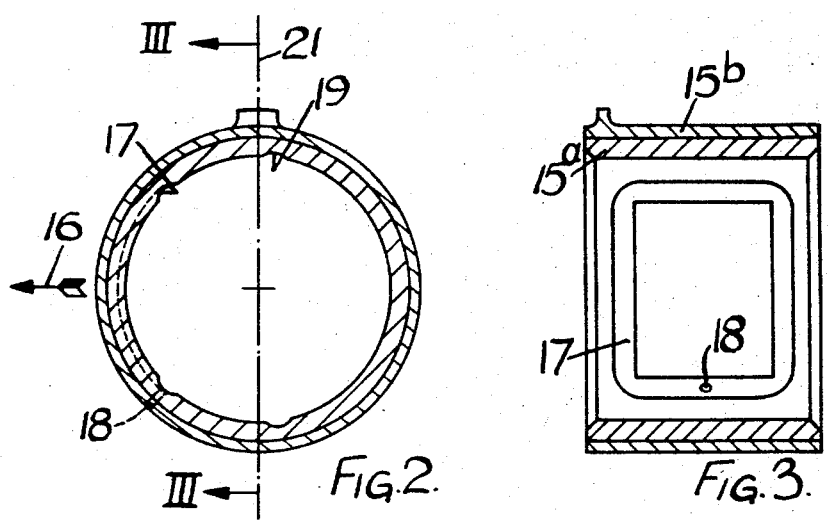

The invention will now be described by way of example with reference to the accompanying drawings in which:

FIGURE 1 is a cross-sectional view of a gear type pump incorporating bearings constructed in accordance with this invention, FIGURE 2 is an enlarged end elevation view of a bearing for use in the pump, and, FIGURE 3 is a cross-sectional view on the line III—III in FIGURE 2.

As seen in FIGURE 1 the gear type pump has a body 10 in which are mounted a pair of meshing gears 11, 12, the former being arranged to be driven through a shaft 13 extending out of the body 10. The body 10 has an inlet and an outlet (not shown) disposed at opposite sides respectively of the point of meshing of the gears, for the entry and discharge of liquid to be pumped.

The gears 11, 12 are mounted upon pairs of hollow integral shafts 14 respectively forming journals running in bearings 15 which are, in turn mounted in the body 10, one such bearing 15 being illustrated in the enlarged views designated FIGURES 2 and 3 respectively.

Since the bearings 15 of a gear pump are always loaded in a predetermined direction, when the pump is in use, the problem of adequate lubrication is particularly acute. In FIGURE 2 the direction of action is indicated by the arrow 16.

In order to overcome this problem, the bearings 15 are constructed as illustrated in FIGURES 2 and 3, each comprising an inner and an outer cylindrical shell 15a, 15b respectively. In the interior face of the inner shell 15a is formed a rectangular groove 17, two limbs extending lengthwise of the bearing and the remaining two extending transversely and joining the ends of the other two limbs, as illustrated in FIGURE 3. The two lengthwise extending limbs are disposed equally at opposite sides of a plane containing the axis of the bearing and extending in the direction of the applied load, indicated by the arrow 16. At at least one position, there is a bore 18 extending through both the inner and outer shells and through this lubricant can be supplied from a suitable source (not shown) through feed galleries 20 in the body 10. The lubricant is supplied under pressure so that there is an hydraulic force applied to the journal shaft 14 within each bearing opposing the load applied to the bearing. Disposed at positions spaced from the lengthwise limbs of the groove 17 is a further pair of grooves 19 respectively. These grooves 19 are disposed at near diametrically opposite positions and lie at the opposite side of a plane indicated at 21 containing the axis of rotation and extending perpendicularly to the first mentioned plane. The grooves 19 extend lengthwise of the bearing 15 and to the edges thereof. Lubricant reaching these grooves 19 can escape from the bearing into the interior of the pump body 10.

The two further grooves 19 are provided so that in use, there shall be no pressurised lubricant at the side of the bearing remote from the groove 17.

It will be realised that the grooves 17 can be replaced by a single groove or multiple grooves or other openings in the bearing inner shell 15a, any such groove or grooves however must be disposed symmetrically on opposite sides of the plane extending in the load direction and on the side of the further plane 21 remote from the direction from which the load is applied. Furthermore the grooves 19 may be replaced by one or more grooves or other openings which however are disposed to prevent pressurised lubricant from reaching the side of the bearing 15 remote from the grooves 17 or their equivalents.

It will be realised that the pressure of the lubricant entering by the grooves 17 must be so calculated that the desired lifting effect on the journal takes place but excessive leakage through the grooves 19 is prevented. Clearly, the positions of the grooves 17 and the clearance between the bearing 15 and the journal 14 are critical.

Having thus described my invention what I claim as new and desire to secure by Letters Patent is:

1. A journal bearing having in its interior, at least one opening disposed symmetrically about a plane containing the journal axis and extending in the direction of a load which is applied when the bearing is in use, said opening being at the side of the axis of rotation of the bearing remote from that at which the load is applied, means for permitting the entry of lubricant under pressure to said opening and at least one further opening in the bearing at the side of a further plane remote from said first mentioned opening, said further plane containing the axis and extending perpendicularly to the first mentioned plane, and escape passage means through which lubricant can escape from said further opening.

2. A bearing as claimed in claim 1 in which there are two of said openings, both disposed symmetrically about the first mentioned plane.

3. A bearing as claimed in claim 1 in which there are two of said further openings disposed symmetrically at opposite sides respectively of said first mentioned plane, and said further openings being disposed adjacent to said further plane.

References Cited

UNITED STATES PATENTS 1,271,968    7/1918    Wood    103—126
2,960,370    11/1960    Love et al.    308—240 XR DONLEY J. STOCKING, *Primary Examiner.*
LEONARD H. GERIN, *Assistant Examiner.*

U.S. Cl. X.R.

103—126; 308—9